United States Patent Office 3,489,642
Patented Jan. 13, 1970

---

3,489,642
CHLORINATED AND CHLOROSULFONATED POLYETHYLENE - ETHYLENE/ACRYLIC ACID COPOLYMER BLENDS
Ralph O. Heuse, New Castle County, Del., assignor to E. I. du Pont de Nemours and Company, Wilmington, Del., a corporation of Delaware
No Drawing. Filed May 10, 1968, Ser. No. 728,356
Int. Cl. B32b *13/04, 19/08, 27/08*
U.S. Cl. 161—205                            16 Claims

---

ABSTRACT OF THE DISCLOSURE

Homogeneously chlorinated or chlorosulfonated blends of (a) about 65 to 90 percent by weight of a linear polyethylene and (b) about 10 to 35 percent by weight of a copolymer of ethylene and acrylic or methacrylic acid containing from about 1 to 20 weight percent of the acid are provided. The blends contain up to about 3 percent by weight sulfur and from about 22 to 45 percent by weight chlorine. When crosslinked by addition of a polyvalent metal oxide and calendered, the blends provide solvent-weldable roofing films of high strength and modulus.

BACKGROUND OF THE INVENTION

A common problem in the construction and maintenance of buildings and the like results from the expansion and contraction of building members induced by changes in weather conditions. Particularly in roofing construction, and especially where roofing members are joined, such expansion and contraction renders it difficult to maintain roofing in a sealed condition over a long period of time.

One technique that has evolved to combat the effect of climatic changes on roofing involves adhesively securing a rubber-like film to substrate members which are then laid side-by-side on the roof and joined to one another by overlapping strips of solvent welded film. Ideally, the film seals the roof against weather, yet will expand and contract in conformance with roof movement without tearing. In actual practice, however, such roofing films have often proved unsatisfactory from a number of standpoints. In a particular aspect, where chlorinated or chlorosulfonated polyethylene films are employed, difficulty has been encountered in providing in combination both ease of application and the desired modulus. For example, chlorosulfonated polyethylene film roofing with chlorine content sufficient to provide high modulus is characterized by poor solvent weldability at application temperatures below about 70° F., when made using sulfur dioxide and chlorine according to "gas processes" such as that disclosed in U.S. Pat. 2,212,786 to McQueen. Solvent welding, as discussed herein, is an essential part of economic roofing film application. On the other hand when the chlorosulfonated polyethylene is manufactured by a sulfuryl chloride process, such as is disclosed in U.S. Pat. 3,299,014 to Kalil, solvent weldability is enhanced but the modulus and tensile strength of such compositions is not as great as is desirable for roofing films, especially at temperatures of 50 to 70° C., such as are encountered on roofs in warm climates in the summer. Attempts to enhance strength by blending with various rubber and plastic latexes only destroy solvent weldability.

SUMMARY OF THE INVENTION

According to this invention, there are provided homogeneously chlorinated or chlorosulfonated polymer blends of (a) about 65 to 90 percent by weight of a linear polyethylene of density at least about 0.94 and a melt index not greater than about 20, and (b) about 10 to 35 percent by weight of a copolymer of ethylene and

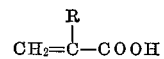

wherein R is methyl or hydrogen, the said copolymer containing from about 1 to 20 percent by weight units derived from

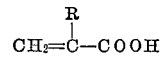

Chlorine content of the polymer blend is about 22 to 45 percent by weight, with the proviso that at chlorine contents less than about 24 percent by weight, the said copolymer contains about 1 to 4 percent by weight units derived from

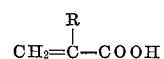

Sulfur content of the polymer blend ranges up to about 3 percent by weight of the blend. Incorporation of a polyvalent metal oxide in the polymer blend leads to metallocarboxylate crosslinking whereby strength and modulus are substantially improved without diminishing solvent weldability. Where a chlorosulfonated blend is intended, the above desirable properties are obtained regardless of the method of chlorosulfonation, so long as the method employed provides a homogeneous product.

DESCRIPTION OF THE INVENTION

An essential component of the invention is a chlorinated or chlorosulfonated copolymer of ethylene and acrylic or methacrylic acid. Methacrylic acid is preferred by reason of its low cost and ready availability. The parent copolymers are available commercially and may be prepared by conventional techniques, such as that set out in Canadian Patent 655,298 to Armitage. The parent copolymer should contain from about 1 to 20 percent by weight of the said acid. At least about one percent is required to provide sufficient crosslinking sites for appreciable improvement in tensile strength and modulus, while proportions greater than about 20 percent are uneconomical and markedly diminish compatibility with the chlorinated or chlorosulfonated polyethylene. In normal practice 3 to 15 percent of the acid by weight of copolymer is employed. It is understood that within the copolymer are contained, not the acid itself, but units derived therefrom and of the same molecular weight. Melt index of the parent copolymer is usually from 1 to about 120, and is not especially critical for present purposes. All melt indices herein are determined according to ASTM D1238.

Polyethylene employed in the polymer blend is preferably liner, i.e., having a density of at least about 0.94. Melt index of the polyethylene should be no greater than about 20, in order to provide roofing film of adequate modulus and tensile strength; and melt index is preferably from about 1 to 10. Polyethylene stress exponents for best results according to the instant invention range from about 1.4 to 1.9.

Substantially lower stress exponents indicate a narrow distribution of molecular weights, resulting in a deficiency of the higher molecular weight moieties desired for optimal strength in relatively "uncured" roofing films prepared according to the inventon. Stress exponent is a measure of the slope of the log shear rate—long shear stress curve obtained by measuring melt index at 2160 g. and 6480 g. loading.

The proportion of copolymer in the polyethylene-copolymer blend must be held below about 35 percent by weight of the blend to insure solvent weldability in films produced from chlorinated or chlorosulfonated blends according to the invention. At least about 10 percent by weight of the copolymer should be employed, since lesser amounts have little appreciable effect in increasing modulus and tensile strength. Preferably, the polymer blend contains from about 15 to 25 percent copolymer by weight of the blend. The polyethylene-copolymer blend is homogeneously clorinated or chlorosulfonated to reduce crystallinity and provide elastic properties desirable for use of the ultimate composition in its various applications. The blend can contain up to about 3 percent by weight sulfur, and preferably contains from about 0.5 to 2 percent sulfur. To insure solvent weldability in films produced according to the invention, chlorine content of the chlorinated or chlorosulfonated polymer blend should be from 22 to 45 percent by weight, and preferably is from 25 to 40 percent. Below about 24 weight percent chlorine, however, acid content of the copolymer should be held below about 4 percent by weight of the copolymer to ensure solvent weldability. Polyethylene can be mixed and chlorinated or chlorosulfonated together. Alternatively, of course, the components of the polymer blend can be chlorinated or chlorosulfonated before being added or combined with one another. Hence, reference to a chlorinated or chlorosulfonated polymer blend of the polyethylene and copolymer comprehends a blend containing chlorinated or chlorosulfonated polyethylene and copolymer components, whether added as such or added and then subjected in the blend to chlorination or chlorosulfonation. For the sake of clarity, however, melt index, density, proportions of the components relative to one another, and percent by weight of units derived from

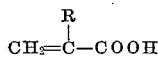

contained in the copolymer refer to the unchlorinated or unchlorosulfonated components. On the other hand, percent chlorine and percent sulfur are based on the weight of the chlorinated or chlorosulfonated blend.

Chlorination techniques are well known to those skilled in the art; see, for example, U.S. Patent 3,299,014 to Kalil and U.S. Patent 2,503,252 to Ernsberger. Chlorosulfonation can be by the action of chlorine and sulfur dioxide, such as is set out in U.S. Patent 2,982,759 to Heuse; by a sulfuryl chloride process such as that set out in U.S. Patent 3,299,014 to Kalil; or by any other technique known to the art to result in homogeneous chlorination or chlorosulfonation.

Polymer blends according to the invention are particularly advantageous in the production of roofing films, as is noted above. When a polyvalent metal oxide is compounded with the polyethylene-copolymer blend, metallo-carboxylate formation provides crosslinking which substantially improves strength and modulus while maintaining solvent weldability of the ultimate film. For observable improvement in the compounded roofing film, metal oxide should be present in the amount of at least about one-half equivalent per equivalent of —COOH in the blend. During compounding and calendering, metal oxide reacts with two or more carboxyl groups with liberation of water, and thereby links copolymer chains by metallo-carboxylate bridging. Significant increases in strength are obtained when as little as one-half of the carboxyl groups are salt-linked (corresponds to about one-half equivalent of metal oxide per equivalent of —COOH). Preferably, substantially all carboxyl groups are salt-linked (corresponds to about one equivalent of metal oxide per equivalent of —COOH). Metal oxide in moderate excess of the amount required for complete reaction of carboxyl groups is not harmful. In the case of the chlorosulfonates, some additional cross-linking may occur over a period of time (6 months or longer). Unreacted metal oxide acts merely as a filter.

The desired metallo-carboxylate crosslinking reaction proceeds merely upon compounding the various ingredients, without exterior application of heat. Roofing films of the invention are not further cured as with accelerators normally used with chlorosulfonated polyethylene or peroxides as used with chlorinated polyethylene, but are instead suitable for use immediately following calendering. Metallic oxide curing is further discussed in U.S. Patents 2,416,060 and 2,681,327 to McAlevy et al. and Brown, respectively.

Polyvalent metal oxide crosslinking agents useful in the instant invention include calcium, magnesium, lead, and other such polyvalent oxides generally employed in rubber manufacture. Calcium, and magnesium oxides, both of ready availability and in wide use in the rubber industry, are preferred. The term "oxides" as used herein includes hydrated oxides, or hydroxides, of the polyvalent metals. Exemplary hydrated oxides are calcium hydroxide and magnesium hydroxide.

In compounding the roofing compositions, various pigments, fillers, screening agents, and the like are desirably added, as is conventional in the rubber industry.

Depending upon desired end use, fillers can be added in amounts ranging from as low as 25 parts to as much as 150 parts per hundred parts of polymer blend. Examples of fillers include whiting (preferred), kaolin clay, carbon black, blanc fixe, silica, hydrated silica, and the like. The particular filler employed is not critical to the invention.

Pigments can be incorporated in the roofing composition in amounts of, for example, from 2 to 100 parts per hundred parts of polymer blend. Exemplary pigments include phthalocyanines, carbon black, and titanium dioxide. Pigments such as titanium dioxide and carbon black also act as screening agents, preventing film degradation by the sun's ultraviolet rays. At least about 30 parts of titanium dioxide is required for the latter purpose. Compounded blends may also include antioxidants such as 2,6-ditertiarylbutyl-4-methyl phenol and other hindered phenols. The blends also desirably contain a small amount of roll release agent such as a polyethylene glycol wax of molecular weight of about 1000 to 4000 to assist calendering in a manner known to the art.

Components of the instant roofing composition are compounded on a rubber mill or in a conventional internal mixer, such as a Banbury mixer. The compounded blend is then calendered in conventional apparatus, such as a three- or four-roll calender to produce a film with or without backing. The film, usually of about 10 to 40 mils in thickness, and preferably about 10 to 20 mils, is thereafter applied in roofing construction.

The preferred method of application is with a frangible backing, such as rubber-bonded asbestos felt, to which the film is applied in a calendering operation. Neoprene is the preferred bonding rubber, but butadiene-styrene copolymers, butadiene-acrylonitrile copolymers, butyl and other synthetic rubbers may be employed. The asbestos-backed film is then applied to a rigid decking member such as plywood, fiber board, or the like by rolling on an adhesive such as a neoprene cement or by mopping the decking with hot asphalt. Sections of the decking laminate are then laid on the roof and connected by an unbacked tape (e.g., 1 to 3 inches in width) of the roofing film which is attached to the film on the decking by solvent welding. Solvent welding is accomplished by wetting the edge of the film in place in the tape to be applied with a solvent such as trichloroethylene, immediately bringing the two surfaces into contact, and applying moderate pressure as with a roller. Other solvents that may be used include toluene, xylene, and tetrachloroethylene. Roofing of the character described permits maximum shifting of the roof structure without decreasing its sealed condition. For example, the connecting tape can stretch to accommodate movement of decking members. When shifting causes a break in the frangible backing, the elastomeric film layer pulls away from the backing and stretches with tearing to span the break.

The invention is illustrated in the following examples, in which all parts and percentages are by weight unless otherwise indicated. Elastic modulus, maximum tensile strength, and elongation at break are determined in accordance with the procedure of ASTM D-412-66, on an "Instron" testing device, available from the Instron Corporation, Canton, Massachusetts.

EXAMPLE 1

(A) Two pounds of a polyethylene having a density of about 0.97, a melt index of 4 and a stress exponent of 1.48 together with a 0.5 pound of ethylene-methacrylic acid copolymer having a melt index of 8 and containing 12% methacrylic acid is dissolved in carbon tetrachloride at 105° C. and chlorosulfonated according to the procedure set out in U.S. Patent 3,299,014 to Kalil. The product, which is isolated by drum drying, contains 24.8% combined Cl and 1.17% combined sulfur.

The chlorosulfonated polymer is combined with the ingredients given below on a rubber mill and calendared as a 30-mil film, which when applied as described herein provides a long-lasting roof.

| | Parts |
|---|---|
| Chlorosulfonated blend | 100 |
| Magnesium oxide | 4 |
| Whiting | 50 |
| Titanium dioxide | 50 |
| "Ionol" [1] | 2 |
| Carbowax 4000 [2] | 1 |

[1] 2,6-ditertiary butyl-4-methylphenol, available from the Shell Oil Company.
[2] A polyethylene glycol wax, available from Union Carbide Company.

The unsupported pressed film typically shows the following physical properties at 70° C. when tested on an "Instron" testing device at 20 inches/minute.

| | |
|---|---|
| 100% modulus _____ p.s.i__ | 110 |
| Maximum tensile strength _____ p.s.i__ | 110 |
| Elongation at break _____ percent__ | 180 |

The film is solvent weldable with trichloroethylene at temperatures as low as 15° C. Satisfactory results are also obtained when polymer is chlorinated according to the procedures set out in U.S. Patent 2,982,759 to Heuse without addition of sulfur dioxide.

(B) For purposes of comparison, films of chlorosulfonated polyethylene (not containing the polyethylene/methacrylic acid copolymer provided in part A of the example) are tested. The films are made according to the procedure of part A, except that in place of the chlorosulfonated blend there are employed chlorosulfonated polyethylenes made by the "gas" and sulfuryl chloride processes, respectively. Testing of the unsupported pressed films on an "Instron" device at 20 inches/minute showed the physical properties set out in the table below.

TABLE I

| Chlorosulfonated Polyethylene Film | Stress-Strain 70° C. | | | Stress-Strain 25° C. | | |
|---|---|---|---|---|---|---|
| | $M_{100}$ | Max. T | $E_B$ | $M_{100}$ | Max. T | $E_B$ |
| Gas process [1] | 80 | 80 | 240 | 660 | 790 | 400 |
| Sulfuryl [2] chloride process | 25 | 25 | 250 | 420 | 630 | 530 |

[1] 25-27% Cl, 1% S, 3-5 melt index. Outside scope of the invention, and included only for comparison.
[2] 25-27% Cl, 1% S, 3-4 melt index. Outside scope of the invention, and included only for comparison.

By comparison with part A, it is evident that films of the invention are superior at high temperature to films containing no ethylene/methyacrylic acid copolymer, in respect both to modulus and tensile strength.

EXAMPLES 2 THROUGH 12

Compositions identified in Table II below are formulated according to the general procedure and recipe of Example 1, with the exception that in Example 9, the recipe includes 6 parts metal oxide, while all other examples employ but 4 parts of the metal oxide per 100 parts of polymer blend.

Stress-strain test results for the metallo-carboxylate crosslinked films of the various examples are set out in Table III below. In each case, strength and modulus are as good as or better than other commercial films, particularly at higher temperatures. Comparison with the values obtained in part B, Example 1 indicates that even at 25° C., strength and modulus of the instant films are superior to that of the films not containing the ethylene/methacrylic acid copolymer. At the same time, each of the films produced according to this invention is

TABLE II

| Polymer Mix to Chlorosulfonation | Example No. | | | | | | | | | | |
|---|---|---|---|---|---|---|---|---|---|---|---|
| | 2 | 3 | 4 | 5 | 6 | 7 | 8 | 9 | 10 | 11 | 12 |
| Ethylene/Methacrylic Acid Copolymer: | | | | | | | | | | | |
| Pounds in chlorosulfonation recipe | 0.5 | 0.5 | 0.833 | 0.525 | 0.613 | 0.5 | 0.5 | 0.5 | 0.5 | 0.5 | 0.5 |
| Percent of polymer mix | 20 | 20 | 33 | 15 | 17.5 | 20 | 20 | 20 | 20 | 20 | 20 |
| Percent methacrylic acid in copolymer | 2.7 | 3.0 | 4 | 12 | 12 | 12 | 12 | 12 | 12 | 15 | 19 |
| Melt index | 4.4 | 8 | 6 | 8 | 8 | 8 | 8 | 8 | 8 | 13 | 9½ |
| Polyethylene: | | | | | | | | | | | |
| Pounds in chlorosulfonation recipe | 2 | 2 | 1.667 | 2.98 | 2.9 | 2 | 2 | 2 | 2 | 2 | 2 |
| Percent of polymer mix | 80 | 80 | 67 | 85 | 82.5 | 80 | 80 | 80 | 80 | 80 | 80 |
| Density | 0.97 | 0.97 | 0.97 | 0.97 | 0.97 | 0.92 | 0.97 | 0.97 | 0.97 | 0.97 | 0.97 |
| Stress exponent | 1.48 | 1.48 | 1.48 | 1.48 | 1.48 | (¹) | 1.48 | 1.48 | 1.40 | 1.67 | 1.48 |
| Melt index | 4 | 4 | 4 | 4 | 4 | 10 | 4 | 4 | 0.8 | 1.1 | 4 |
| Chlorosulfonated Polymer: | | | | | | | | | | | |
| Percent Cl | 27.3 | 41.4 | 27.3 | 26.5 | 27.9 | 23.5 | 23.9 | 23.9 | 27.1 | 27.3 | 27 |
| Percent S | 1.27 | 1.3 | 1.0 | 0.87 | 0.8 | 1.5 | 1.4 | 1.4 | 0.8 | 0.8 | 0.7 |

¹ Not tested.

TABLE III

| Stress-Strain Data | Example No. | | | | | | | | | | |
|---|---|---|---|---|---|---|---|---|---|---|---|
| | 2 | 3 | 4 | 5 | 6 | 7 | 8 | 9 | 10 | 11 | 12 |
| 20″/minute at 25° C.: | | | | | | | | | | | |
| Elastic modulus at 100% Extension, p.s.i. | 570 | 1,070 | 950 | (¹) | 670 | 380 | 1,030 | 1,140 | 840 | 830 | 710 |
| Maximum tensile strength, p.s.i. | 860 | 1,620 | 1,240 | (¹) | 840 | 390 | 1,240 | 1,270 | 1,040 | 900 | 710 |
| Elongation at break, percent | 630 | 330 | 260 | (¹) | >300 | 110 | 300 | 330 | 350 | 430 | 410 |
| 20″/minute at 70° C.: | | | | | | | | | | | |
| Elastic modulus at 100% extension, p.s.i. | 90 | 205 | 280 | 60 | 85 | 90 | 140 | 150 | 110 | 110 | (¹) |
| Maximum tensile strength, p.s.i. | 90 | 210 | 280 | 60 | 95 | 90 | 140 | 150 | 110 | 130 | 145 |
| Elongation at break, percent | 130 | 200 | 90 | 300 | 110 | 120 | 100 | 100 | 100 | 90 | 50 |

¹ Not tested.

solvent weldable at temperatures as low as from 5 to 15° C. Satisfactory results are also obtained when acrylic acid is substituted for methacrylic acid in the copolymer.

While the examples above are directed to the preferred application of the polymer blends provided by the invention, that is, in solvent weldable roofing film, it is understood that use of the blends is not limited thereto. Chlorinated and chlorosulfonated polymer blends made according to the invention are also useful in preparing moisture-resistant flashing, adhesives, and other rubber-base products. Advantages of the roofing films in addition to those illustrated in the examples include load reduction (up to 1,000,000 pounds per 2000 squares) as compared to a standard built-up roof, and the ease of patching which results from the solvent weldability feature.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:
1. A homogeneously chlorinated or chlorosulfonated polymer blend of:
 (a) about 65 to 90 weight percent of a linear polyethylene of at least about 0.94 density and a melt index not greater than about 20; and
 (b) about 10 to 35 weight percent of a copolymer of ethylene and

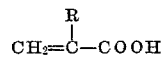

wherein R is methyl or hydrogen and said copolymer contains from about 1 to 20 weight percent units derived from

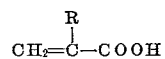

wherein the blend contains up to about 3 weight percent sulfur and about 22 to 45 weight percent chlorine with the proviso that at chlorine contents less than about 24 percent by weight, the said copolymer contains about 1 to 4 percent by weight units derived from

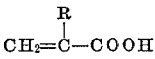

2. A chlorosulfonated blend as defined in claim 1 wherein the sulfur content is from 0.5 to 2 weight percent and wherein

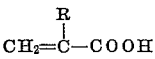

is methacrylic acid.

3. A chlorosulfonated blend as defined in claim 2 wherein chlorine content is greater than about 24 weight percent.

4. A chlorosulfonated blend as defined in claim 3 wherein the methacrylic acid content of the ethylene copolymer is about 3 to 15 weight percent.

5. A chlorosulfonated bleind as defined in claim 4 wherein the amount of linear polyethylene is from about 75 to 85 weight percent, the amount of the ethylene-methacrylic acid copolymer is from about 15 to 25 weight percent, and wherein the melt index of the polyethylene is from about 1 to 10.

6. A composition comprising the homogeneously chlorinated or chlorosulfonated polymer blend of claim 1 and at least about one-half equivalent of a polyvalent metal oxide per equivalent of —COOH.

7. A composition comprising the homogeneously chlorosulfonated polymer blend of claim 3 and at least about one equivalent of a polyvalent metal oxide per equivalent of —COOH.

8. The composition of claim 7 wherein the said metal oxide is selected from the group consisting of calcium oxide and magnesium oxide.

9. A composition comprising the homogeneously chlorinated or chlorosulfonated polymer blend of claim 1 wherein at least about one-half of the —COOH groups are metallo-carboxylate-linked by reaction with a polyvalent metal oxide.

10. A composition comprising the homogeneously chlorosulfonated polymer blend of claim 3 wherein substantially all of the —COOH groups are metallo-carboxylate-linked by reaction with a polyvalent metal oxide.

11. The composition of claim 9 wherein the polyvalent metal oxide is selected from the group consisting of calcium oxide and magnesium oxide.

12. A film comprising the composition of claim 9.

13. A film comprising the composition of claim 11.

14. A laminate of rubber-bonded asbestos felt and the film of claim 12.

15. A laminate of neoprene-bonded asbestos felt and the film of claim 13.

16. A roof decking member having adhesively secured to one side thereof the laminate of claim 15.

References Cited
UNITED STATES PATENTS 3,355,519 11/1967 Müller et al. _____ 260—897
3,326,833 6/1967 Raley _____ 260—28.5

MURRAY TILLMAN, Primary Examiner
C. J. SECCURO, Assistant Examiner

U.S. Cl. X.R.

260—28.5, 45.75, 45.9, 45.95, 41, 897; 161—253, 254, 256